(12) United States Patent
Jeong et al.

(10) Patent No.: US 12,476,443 B2
(45) Date of Patent: Nov. 18, 2025

(54) HIGH VOLTAGE JUNCTION BLOCK AND VEHICLE INCLUDING THE SAME

(71) Applicants: HYUNDAI MOTOR COMPANY, Seoul (KR); KIA CORPORATION, Seoul (KR)

(72) Inventors: Byoungcheol Jeong, Seoul (KR); Seungmin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 143 days.

(21) Appl. No.: 18/588,380

(22) Filed: Feb. 27, 2024

(65) Prior Publication Data
US 2025/0105604 A1 Mar. 27, 2025

(30) Foreign Application Priority Data
Sep. 27, 2023 (KR) .......................... 10-2023-0130391

(51) Int. Cl.
*H05K 9/00* (2006.01)
*B60L 15/00* (2006.01)
*H02G 3/08* (2006.01)

(52) U.S. Cl.
CPC ............ *H02G 3/088* (2013.01); *B60L 15/007* (2013.01); *H02G 3/083* (2013.01); *H05K 9/0015* (2013.01)

(58) Field of Classification Search
CPC ........................... H05K 9/0015; H05K 9/0009
See application file for complete search history.

(56) References Cited

U.S. PATENT DOCUMENTS

| | | | |
|---|---|---|---|
| 10,218,130 B1* | 2/2019 | Jung ..................... | H01R 13/53 |
| 10,717,401 B2* | 7/2020 | Skalski .................... | H02K 5/10 |
| 2002/0006747 A1* | 1/2002 | Yuasa ................ | H01R 13/5208 |
| | | | 439/587 |
| 2013/0314889 A1* | 11/2013 | Grimm ................ | H01R 13/447 |
| | | | 361/823 |
| 2016/0036158 A1* | 2/2016 | Adachi ............. | H01R 13/6581 |
| | | | 439/587 |
| 2016/0134060 A1* | 5/2016 | Hwang .................. | H01R 13/53 |
| | | | 439/587 |
| 2020/0321885 A1* | 10/2020 | Gilet ...................... | H02K 7/006 |
| 2021/0296729 A1* | 9/2021 | Kobayashi .......... | H01M 50/262 |
| 2024/0222901 A1* | 7/2024 | Kim ..................... | H01R 13/521 |

FOREIGN PATENT DOCUMENTS

| KR | 10-1558321 B1 | 10/2015 |
|---|---|---|
| KR | 10-2251423 B1 | 5/2021 |

OTHER PUBLICATIONS

Kia EV9, opening the sale, Jun. 19, 2023.

* cited by examiner

*Primary Examiner* — Hung V Ngo
(74) *Attorney, Agent, or Firm* — MCDONNELL BOEHNEN HULBERT & BERGHOFF LLP (57) ABSTRACT

A high voltage junction block includes a block housing accommodating a circuit module distributing high voltage, a bus bar extending from the block housing, and supplying electric power to an electric power supply target body, a sealing member surrounding a circumference of the bus bar, and protecting moisture from flowing into the bus bar and a terminal of the electric power supply target body electrically connected to the bus bar, and a shield plate provided between the block housing and the sealing member, and protecting noise generated from the electric power supply target body from being leaked to the outside.

17 Claims, 13 Drawing Sheets

HIGH VOLTAGE JUNCTION BLOCK AND VEHICLE INCLUDING THE SAME

CROSS REFERENCE TO RELATED APPLICATIONS

This application claims priority to and the benefit of Korean Patent Application No. 10-2023-0130391 filed in the Korean Intellectual Property Office on Sep. 27, 2023, the entire contents of which are incorporated herein by reference.

BACKGROUND

(a) Field

The present disclosure relates to a high voltage junction block and a vehicle including the same.

(b) Description of the Related Art

A high voltage battery mounted on an electric vehicle supplies electric power to a motor that drives the electric vehicle and supplies the electric power to various electrical devices mounted on the electric vehicle. To this end, in addition to the high voltage battery, an inverter which controls the motor mounted on the electric vehicle and/or a high voltage junction block supplying the electric power to various electrical devices are/is mounted on the electric vehicle.

In recent years, the high voltage junction block and the inverter, and/or the electrical device are electrically connected through a bus bar, and there is a problem in that noise generated from the motor and/or the electrical device is leaked to the outside.

Further, when the high voltage junction block and the motor are connected through the bus bar, if external moisture flows into the bus bar, the high voltage junction block, there may be a problem in that the motor, and/or the electrical device is corroded, a connection portion between respective parts is corroded, or each part is short-circuited.

The above information disclosed in this background section is only for enhancement of understanding of the background of the disclosure and therefore it may contain information that does not form the prior art that is already known in this country to a person of ordinary skill in the art.

SUMMARY

The present disclosure has been made in an effort to provide a high voltage junction block and a vehicle including the same, which can protect flow of moisture between a high voltage junction block and an electric power supply target body electrically connected to the high voltage junction block through a bus bar, and protect noise generated from an electric power supply target body from being leaked to the outside.

An exemplary embodiment provides a high voltage junction block including a block housing accommodating a circuit module distributing high voltage, a bus bar extended from the block housing, and supplying electric power to an electric power supply target body, a sealing member provided to surround a circumference of the bus bar, and protecting moisture from flowing into the bus bar and a terminal of the electric power supply target body electrically connected to the bus bar; and a shield plate provided between the block housing and the sealing member, and protecting noise generated from the electric power supply target body from being leaked to the outside.

In some exemplary embodiments, the high voltage junction block may further include a protruding portion formed to be protruded from the block housing along the circumference of the bus bar, and a seating portion which is formed at an outer periphery of the protruding portion, and on which the sealing member is seated.

In some exemplary embodiments, the sealing member may include a sealing body formed in a shape corresponding to an outer peripheral shape of the protruding portion, and a sealing protrusion protruded toward the electric power supply target body from the sealing body.

In some exemplary embodiments, the sealing member may be made of a rubber material.

In some exemplary embodiments, the shield plate may include a first part disposed between the block housing and the sealing member, a second part extended toward the electric power supply target body from an outer periphery of the first part, and a third part extended from an outer periphery of the second part, and being in close contact with the electric power supply target body.

In some exemplary embodiments, the third part may be tilted at a set angle toward the electric power supply target body, and be in close contact with the electric power supply target body by elastic transformation.

In some exemplary embodiments, a plurality of embosses may be formed in the third part.

The shield plate may be made of a metallic material which is elastically transformable.

Another exemplary embodiment provides a vehicle including an inverter including an inverter housing accommodating a first circuit module driving a motor therein, and a terminal formed in the inverter housing, and a high voltage junction block including a block housing accommodating a second circuit module distributing high voltage, a bus bar extended from the block housing, and electrically connected to the terminal, a sealing member provided to surround a circumference of the bus bar, and protecting moisture from flowing into the bus bar and the terminal, and a shield plate provided between the block housing and the sealing member, and protecting noise generated from the inverter from being leaked to the outside.

In some exemplary embodiments, the vehicle may further include a protruding portion formed to be protruded from the block housing along a circumference of the bus bar, and a seating portion which is formed an outer peripheral of the protruding portion, and on which the sealing member is seated.

In some exemplary embodiments, the sealing member may include a sealing body formed in a shape corresponding to an outer peripheral shape of the protruding portion, and a sealing protrusion protruded toward the electric power supply target body from the sealing body.

In some exemplary embodiments, the sealing member may be made of a rubber material.

In some exemplary embodiments, the sealing member may be in close contact with the inverter housing.

In some exemplary embodiments, the shield plate may include a first part disposed between the block housing and the sealing member, a second part extended toward the inverter from an outer periphery of the first part, and a third part extended from an outer periphery of the second part, and being in close contact with the inverter housing.

In some exemplary embodiments, the shield plate may be elastically transformable.

In some exemplary embodiments, the third part may be tilted at a set angle toward the inverter housing, and be in close contact with the inverter housing by elastic transformation.

In some exemplary embodiments, a plurality of embosses may be formed in the third part.

According to exemplary embodiments, a sealing member provided in a blocking housing of a high voltage junction block is in close contact with an inverter housing of an inverter, so external moisture can be protected from flowing between a bus bar of the high voltage junction block and a terminal of the inverter.

In addition, a shield plate provided in the block housing of the high voltage junction block is in close contact with the inverter housing of the inverter, so noise generated from the inverter can be protected from being leaked to the outside of the high voltage junction block and the inverter.

Besides, an effect which can be obtained or predicted by the exemplary embodiment of the present disclosure is directly or implicitly disclosed in detailed description of the exemplary embodiment of the present disclosure. That is, various effects predicted according to the exemplary embodiment of the present disclosure will be disclosed in the detailed description to be described below.

BRIEF DESCRIPTION OF THE FIGURES

These drawings are for the purpose of describing an exemplary embodiment of the present disclosure, and therefore the technical spirit of the present disclosure should not be construed as being limited to the accompanying drawings.

The drawings referenced above are not particularly illustrated according to a scale, but should be understood as presenting a somewhat brief expression of various preferred features that illustrate the basic principles of the present disclosure. For example, the specific design features of the present disclosure, including specific dimensions, directions, positions, and shapes, will be partially determined by specific intended applications and use environments.

DETAILED DESCRIPTION

The terms used here are only for describing specific exemplary embodiments, and are not intended to limit the present disclosure. As used here, the singular forms are also intended to include plural forms, unless they are explicitly differently indicated by context. It will be appreciated that when terms "include" and/or "including" are used in this specification, the terms "include" and/or "including" are intended to designate the existence of mentioned features, integers, steps, operations, constituent elements, and/or components, but do not exclude the existence or addition of one or more other features, integers, steps, operations, constituent elements, and components, and/or groups thereof. As used here, the terms "and/or" include any one or all combinations of the items which are associated and listed.

The present disclosure will be described in detail so as to be easily carried out by those skilled in the art in a technical field to which the present disclosure pertains. However, the present disclosure can be realized in various different forms, and is not limited to the exemplary embodiments described herein.

A part irrelevant to the description will be omitted to clearly describe the present disclosure, and the same elements will be designated by the same reference numerals throughout the specification.

Further, since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

Suffixes "module" and/or "unit" for components used in the following description are given or mixed in consideration of easy preparation of the present disclosure only and do not have their own distinguished meanings or roles.

Further, in describing a disclosed exemplary embodiment, a detailed description of related known technologies will be omitted if it is determined that the detailed description makes the gist of the embodiment of the present disclosure unclear.

Further, the accompanying drawings are provided for helping to easily understand exemplary embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

It should be understood that, when it is described that a component is "connected to" or "accesses" another component, the component may be directly connected to or access the other component or a third component may be present therebetween.

In contrast, when it is described that a component is "directly connected to" or "directly accesses" another component, it is understood that no element is present between the element and another element.

Hereinafter, a high voltage junction block and a vehicle including the same according to an exemplary embodiment will be described in detail with reference to the accompanying drawings.

Figure 1:
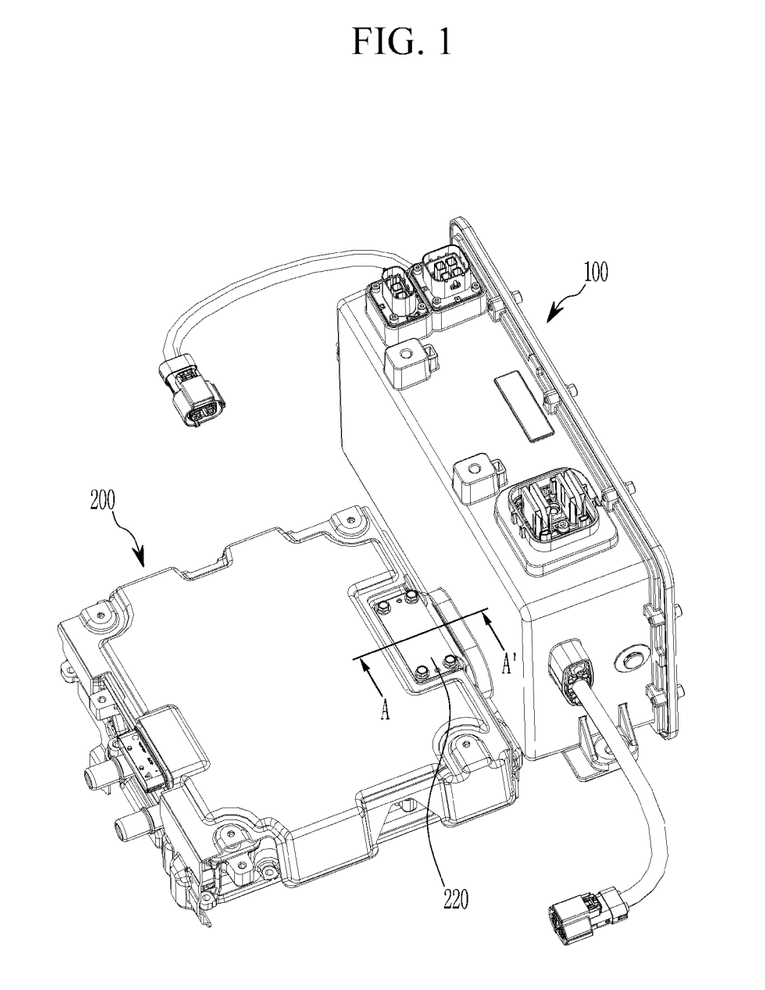
FIG. 1 is a perspective view illustrating configurations of a high voltage junction block and an inverter according to an exemplary embodiment.

FIG. 1 is a perspective view illustrating configurations of a high voltage junction block and an inverter according to an exemplary embodiment. In addition, FIG. 2 is a conceptual view schematically illustrating the configurations of the high voltage junction block and the inverter according to an exemplary embodiment.

Figure 2:
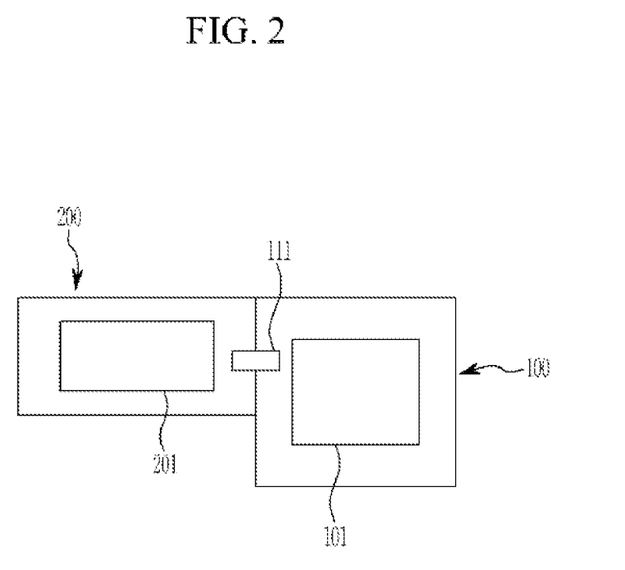
FIG. 2 is a conceptual view schematically illustrating the configurations of the high voltage junction block and the inverter according to an exemplary embodiment.

As illustrated in FIGS. 1 and 2, according to an exemplary embodiment, a high voltage junction block 100 is mounted inside a vehicle (e.g., an electric vehicle), and distributes electric power to an inverter 200 and/or an electrical device mounted inside the electric vehicle.

The inverter 200 converts high-voltage DC power supplied from the high voltage junction block 100 into AC power in 3 phases, U, V, and W, and supplies the AC power to a motor used as a power source of the electric vehicle.

Figure 3:
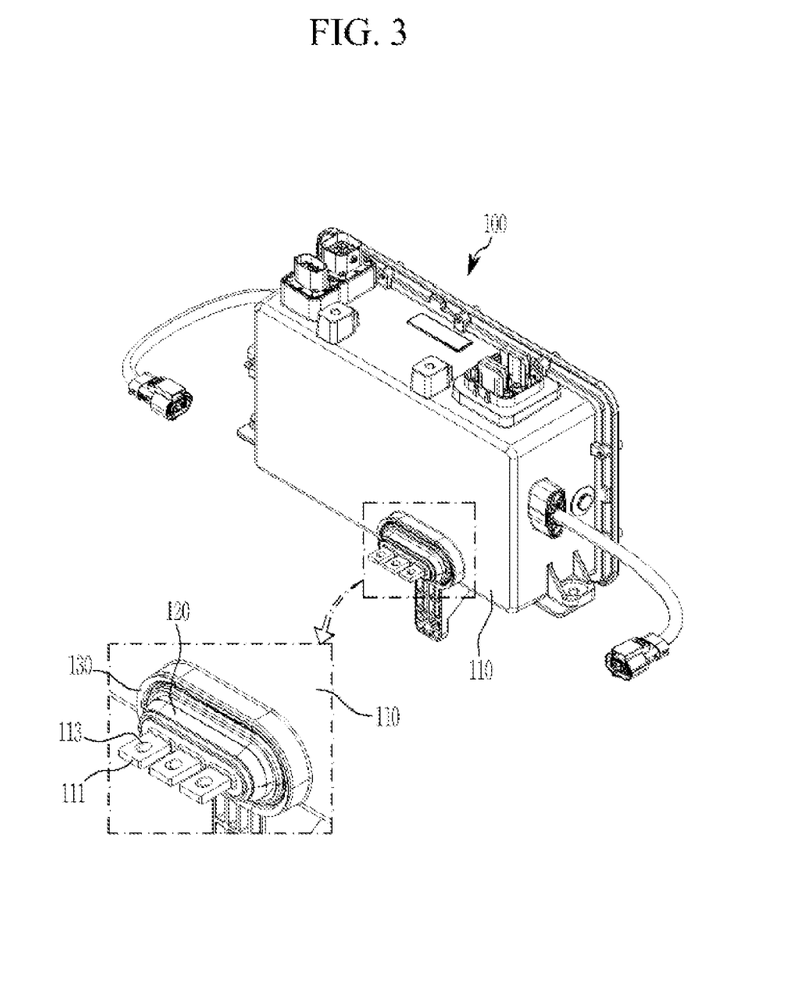
FIG. 3 is a perspective view illustrating the configuration of the high voltage junction block according to an exemplary embodiment.

Referring to FIG. 3, the high voltage junction block 100 may include a block housing 110, a bus bar 111, a sealing member 120, and a shield plate 130.

The block housing 110 may be formed in a substantially rectangular shape, and may accommodate a circuit module 101 (shown in FIG. 2) that distributes high voltage supplied from the high voltage battery to the inverter 200 and/or an electric part (hereinafter, referred to as 'electric power supply target body' as necessary) therein.

The bus bar 111 may be electrically connected to the circuit module 101, and extended to the outside from the block housing 110, and may supply the electric power to the electric power supply target body. The bus bar 111 may be formed to protrude from the block housing 110, and a first fastening hole 113 may be formed in the bus bar 111.

A protruding portion 117 extended from the outside of the block housing 110 along a circumference of the bus bar 111 and a seating portion 118 which is formed at an outer periphery of the protruding portion 117 and on which the sealing member 120 is seated may be formed in the block housing 110. The protruding portion 117 may be formed in a substantially elliptical shape along an outer periphery of the bus bar 111, a cross section of the seating portion 118 may be formed in a substantially "L" shape, and the seating portion may be formed to be concave on the outer periphery of the protruding portion 117 so that the sealing member 120 is seated.

The sealing member 120 may protect external moisture from flowing between the bus bar 111 of the block housing 110 and a terminal 211 coupled to the bus bar 111 and formed in the electric power supply target body. To this end, the sealing member 120 may be provided to surround circumferences of the bus bar 111 of the high voltage junction block 100 and the terminal 211 of the inverter 200.

Figure 4:
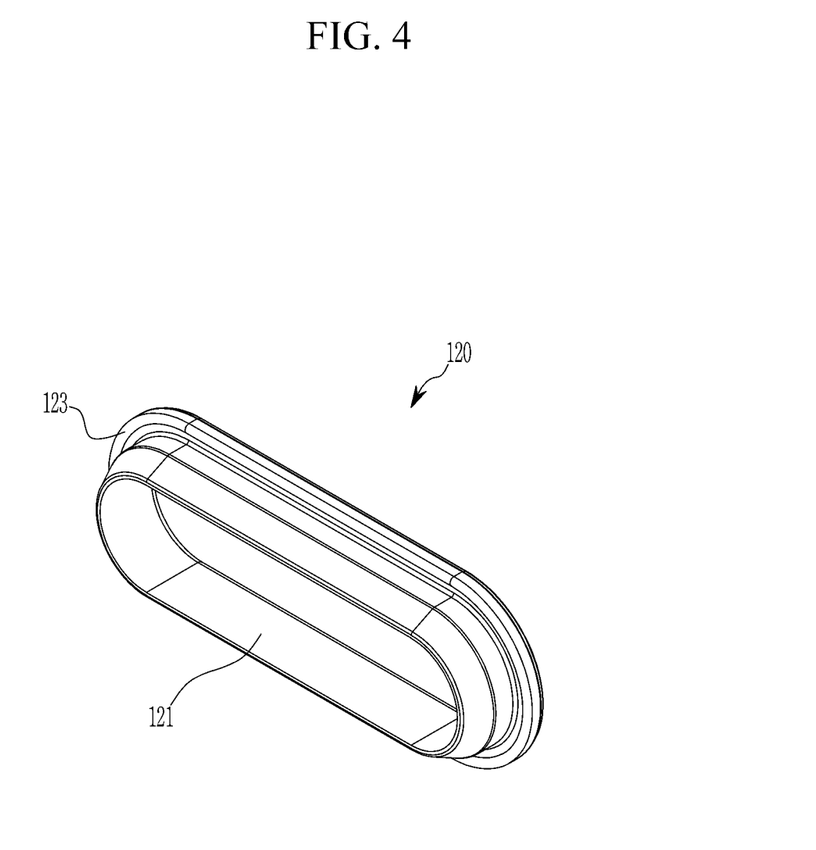
FIG. 4 is a perspective view illustrating a configuration of a sealing member according to an exemplary embodiment.

Referring to FIG. 4, the sealing member 120 may include a sealing body 121 formed in a shape corresponding to an outer peripheral shape of the protruding portion 117, and a sealing protrusion 123 which is protruded toward the electric power supply target body from an outer periphery of the sealing body 121. The sealing body 121 is formed in a substantially elliptical hollow shape to surround the outer periphery of the protruding portion 117, and a cross section of the sealing body 121 is formed in the substantially "L" shape. The sealing protrusion 123 is protruded toward the electric power supply target body (e.g., inverter 200) from an upper portion of the sealing body 121. The sealing protrusion 123 may be formed in a circumferential direction of the sealing body 121.

The sealing member 120 may be made of a rubber material which is elastically transformable. The sealing member 120 made of the rubber material may be pressed-fit, and fixedly installed in the seating portion 118 of the block housing 110. The shield plate 130 may be provided between the block housing 110 and the sealing member 120, and nose generated from the electric power supply target body (e.g., inverter 200) may be protected from being leaked to the outside.

Figure 5:
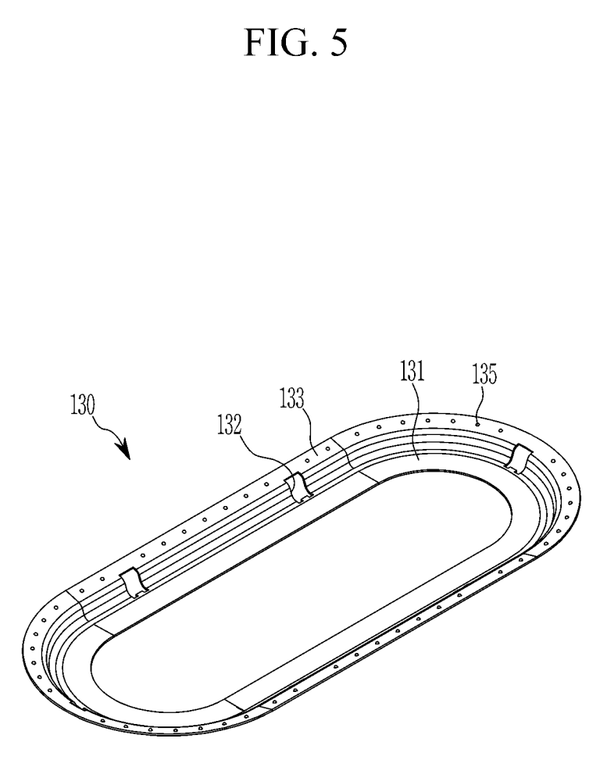
FIG. 5 is a perspective view illustrating a configuration of a shield plate according to an exemplary embodiment.

Referring to FIG. 5, the shield plate 130 may include a first part 131, a second part 132, and a third part 133. The shield plate 130 may be made of a thin metallic material which is elastically transformable.

The first part 131 may be disposed between the block housing 110 and the sealing member 120, and may be formed in the substantially hollow elliptical shape along the outer periphery of the bus bar 111. The second part 132 is extended toward the electric power supply target body (e.g., inverter 200) from an outer periphery of the first part 131. In addition, the third part 133 is extended from an outer periphery of the second part 132, and formed to be in close contact with the electric power supply target body (e.g., the inverter housing 210 of the inverter 200). To this end, the third part 133 may be formed to be tilted at a set angle toward the electric power supply target body (e.g., the inverter housing 210 of the inverter 200). A plurality of embosses 135 which are protruded toward the inverter 200 may be formed in the third part 133.

When the sealing member 120 is inserted while the shield plate 130 is disposed in the seating portion 118, the third part 133 of the shield plate 130 is not in close contact with the inverter housing 210 by transformation of the sealing member 120, and a gap may be generated between the third part 133 of the shield plate 130, and the inverter housing 210. In this case, the gap between the shield plate 130 and the inverter housing 210 may be minimized by the emboss 135 which is protruded in the third part 133 of the shield plate 130.

Figure 6:
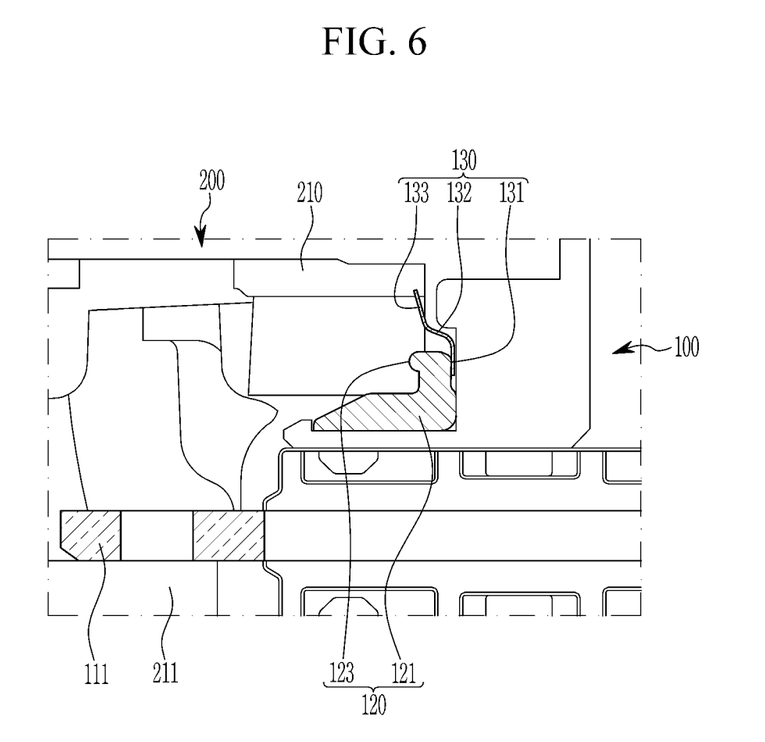
FIG. 6 is a cross-sectional view taken along line "A-A" of FIG. 1.

Referring to FIG. 6, when the high voltage junction block 100 and the inverter 200 are coupled, the sealing member 120 may be in close contact with the inverter housing 210 of the inverter 200 while the sealing member 120 is compressed between the block housing 110 and the inverter housing 210. In this case, the sealing member 120 may be easily in close contact with the inverter housing 210 by the sealing protrusion 123.

As a result, the external moisture may be protected from flowing into the bus bar 111 of the high voltage junction block 100 and the terminal 211 of the inverter.

Further, when the high voltage junction block 100 and the inverter 200 are coupled, the shield plate 130 may be in close contact with the inverter housing 210 of the inverter 200 while the third part 133 of the shield plate 130 which is in contact with the inverter housing 210 is elastically transformed. As a result, the noise generated from the inverter 200 may be protected from being leaked to the outside of the high voltage junction block 100 and the inverter 200.

Figure 7:
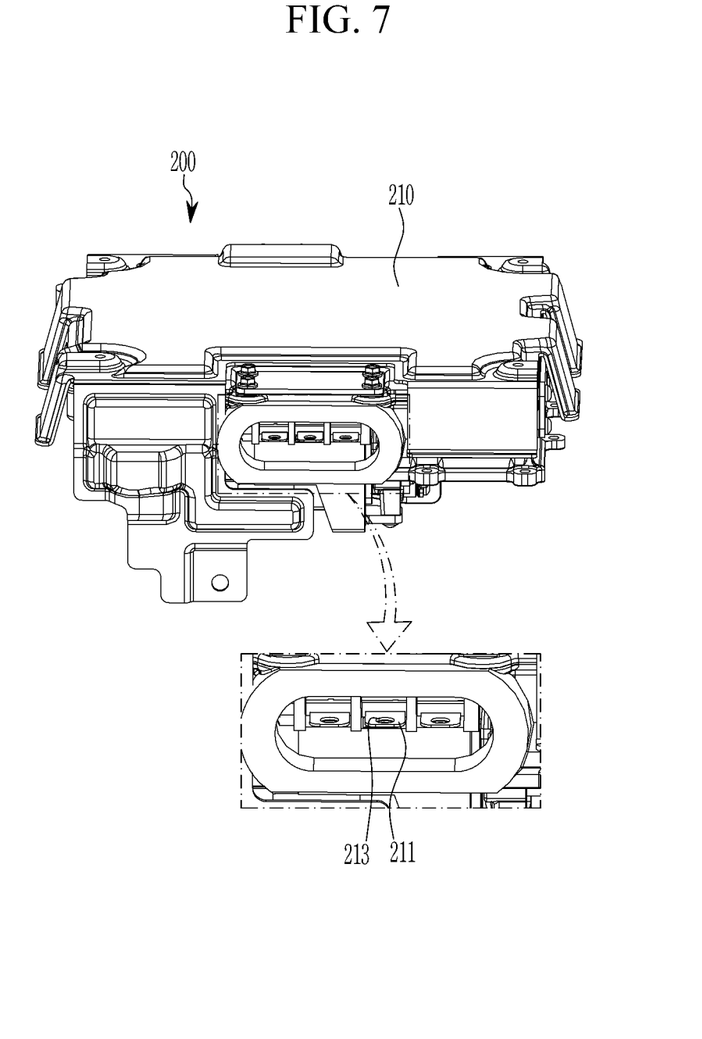
FIG. 7 is a perspective view illustrating the configuration of the inverter according to an exemplary embodiment.

Referring to FIG. 7, the inverter 200 may include the inverter housing 210 accommodating a circuit module 201 for driving a motor therein, and the terminal 211 formed in the inverter housing 210, and electrically connected to the circuit module 201. A second fastening hole 213 corresponding to the first fastening hole 113 of the bus bar 111 is formed in the terminal 211. The terminal 211 and the bus bar 111 may be fastened and electrically connected through a bolt, and the electric power distributed from the high voltage junction block 100 may be supplied to the inverter 200 through the bus bar 111 and the terminal 211.

Hereinafter, a process of assembling the high voltage junction block 100 and the electric power supply target body according to an exemplary embodiment will be described in detail with reference to the accompanying drawings.

Figure 8A:
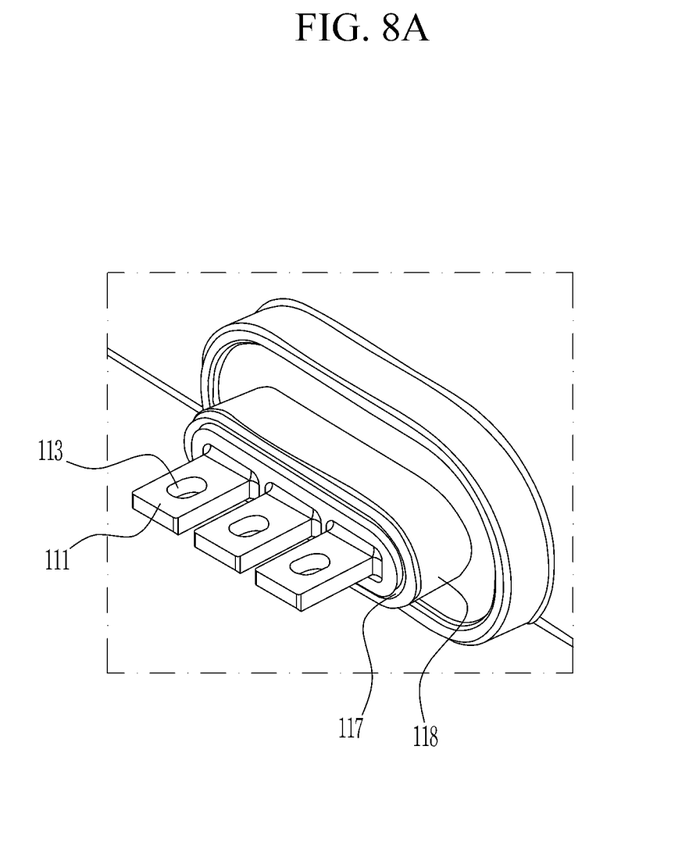
FIGS. 8A, 8B, 8C, 8D, 8E, and 8F are diagrams for describing an assembly process of the high voltage junction block and the inverter according to an exemplary embodiment.

Referring to FIG. 8A, the high voltage junction block 100 in which the bus bar 111 is formed to be protruded is disposed in the block housing 110.

Figure 8B:
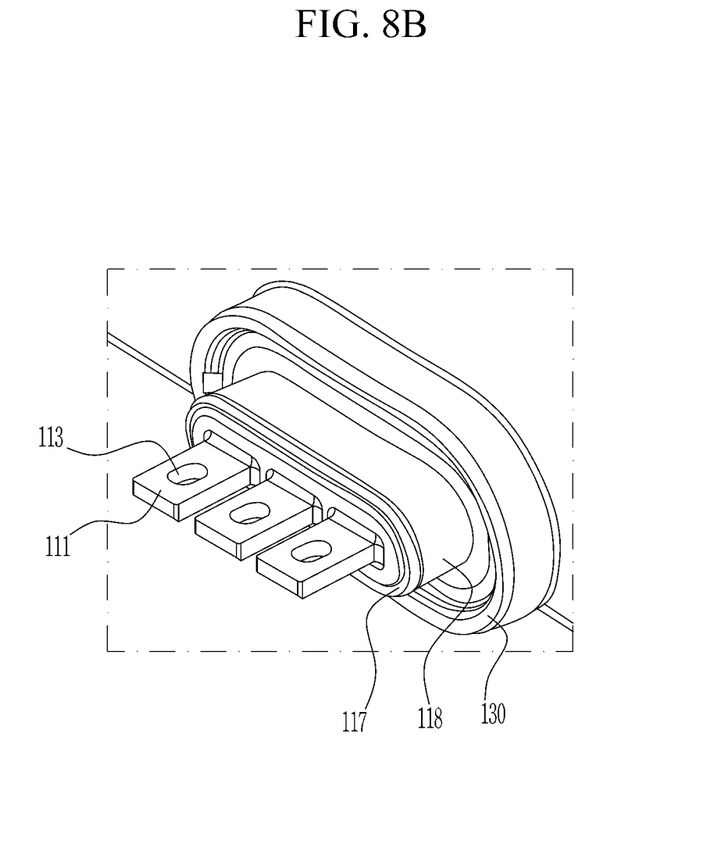

Referring to FIG. 8B, the shield plate 130 is disposed in the seating portion 118 formed in the protruding portion 117 of the block housing 110.

Figure 8C:
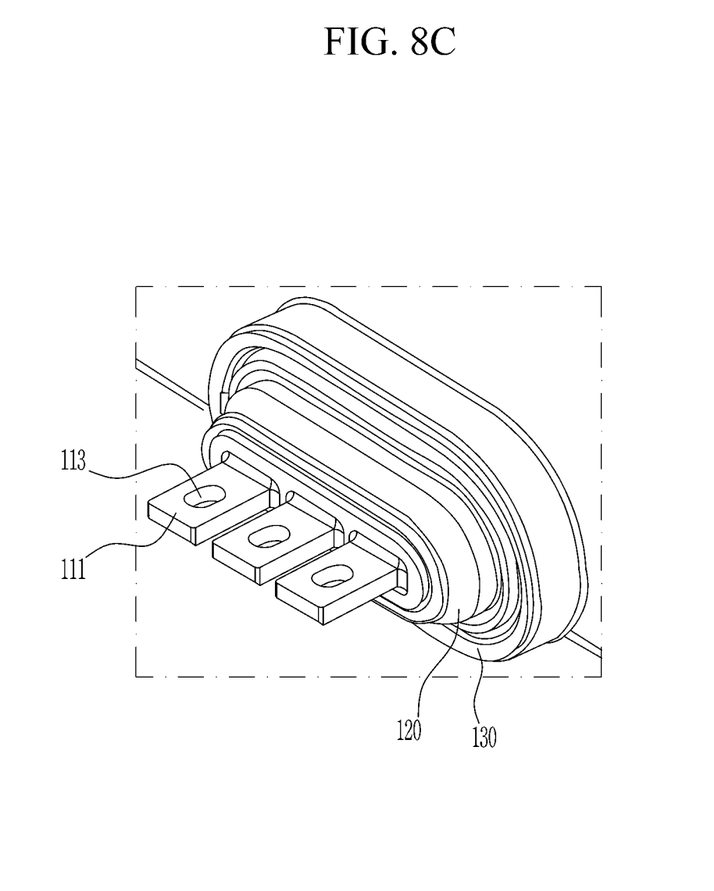

Referring to FIG. 8C, the sealing member 120 is press-fit, and coupled into the seating portion 118 of the block housing 110 while the shield plate 130 is disposed in the seating portion 118.

Figure 8D:
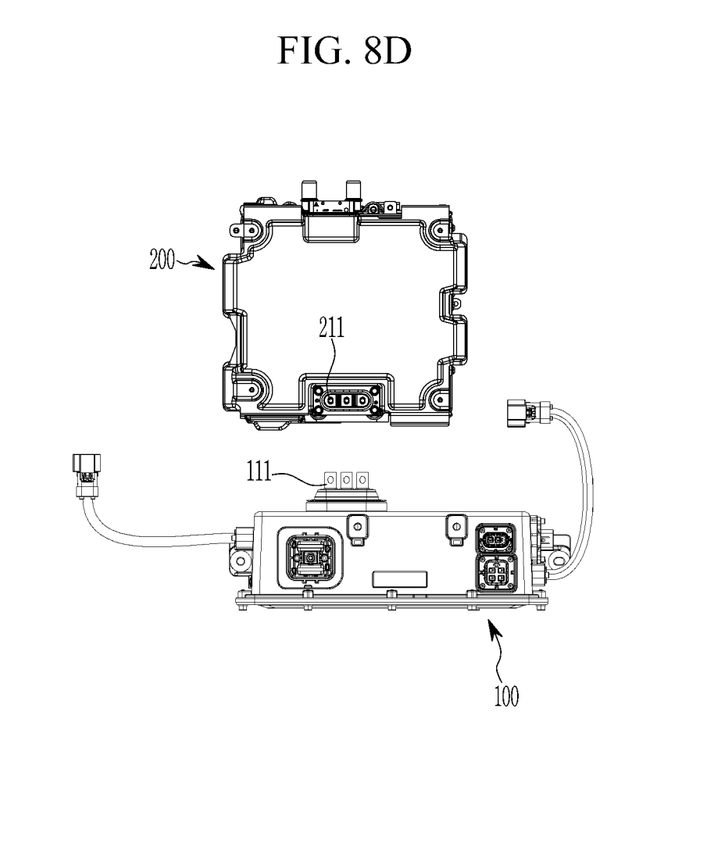

Referring to FIG. 8D, the first fastening hole 113 formed in the bus bar 111 of the high voltage junction block 100 and the second fastening hole 213 formed in the terminal 211 of the inverter 200 are disposed to match each other.

Figure 8E:
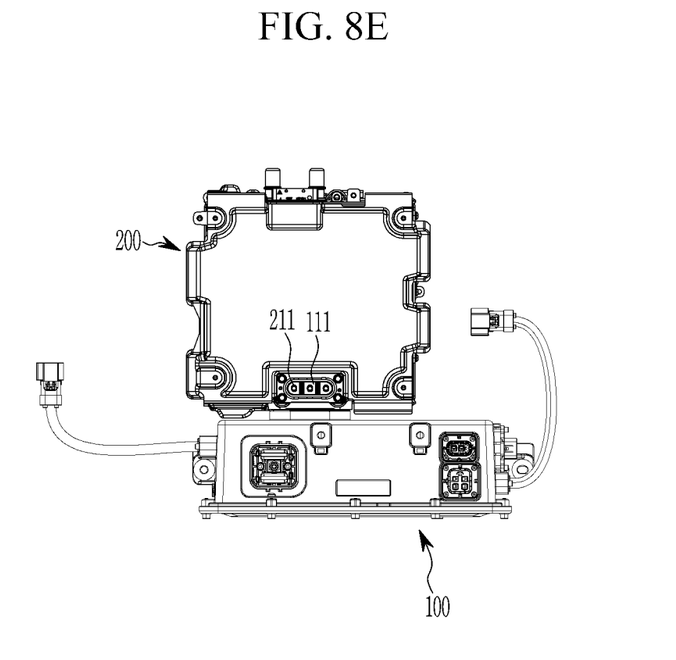

Referring to FIG. 8E, the first fastening hole 113 of the bus bar 111 and the second fastening hole 213 of the terminal 211 are coupled through the bolt.

At a location where the first fastening hole 113 formed in the bus bar 111 of the high voltage junction block 100 and the second fastening hole 213 formed in the terminal 211 of the inverter 200 match each other, the sealing member 120 overlaps with the inverter housing 210 of the inverter 200 in terms of a design. However, the sealing member 120 is in close contact with the inverter housing 210 while being compressed and transformed with the sealing body 121 of the sealing member 120 made of the rubber material. As a result, the external moisture is protected from flowing into the bus bar 111 and the terminal 211.

Similarly thereto, at the location where the first fastening hole 113 formed in the bus bar 111 of the high voltage junction block 100 and the second fastening hole 213 formed in the terminal 211 of the inverter 200 match each other, the third part 133 of the shield plate 130 overlaps with the inverter housing 210 of the inverter 200 in terms of the design, however, the third part 133 of the shield plate 130 is in close contact with the inverter housing 210 while the third part 133 of the shield plate 130 made of the elastically transformable material is elastically transformed. As a result, the noise generated inside the inverter 200 is protected from being leaked to the outside through the bus bar 111 and the terminal 211.

Figure 8F:
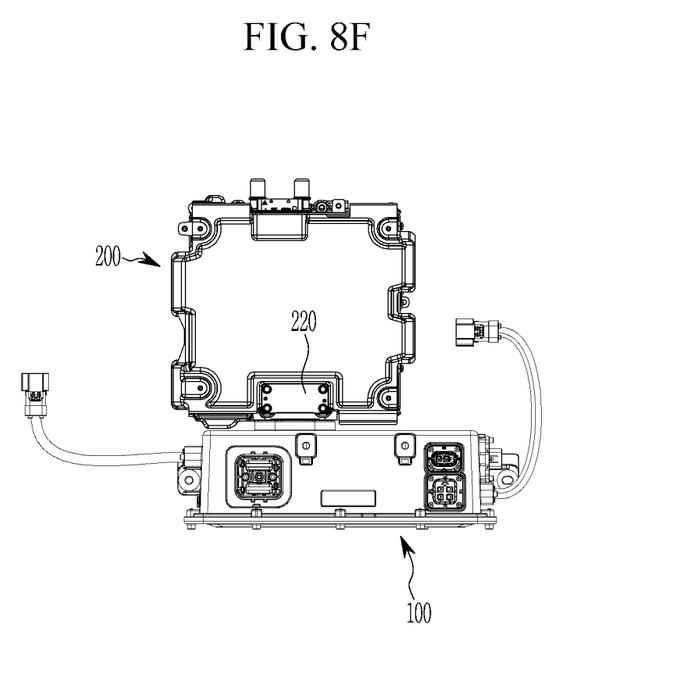

Referring to FIG. 8F, last, the bus bar 111 of the high voltage junction block 100 and a cover plate 220 covering the terminal 211 of the inverter 200 are fastened to the inverter housing 210 through the bolt.

According to an exemplary embodiment, the sealing member 120 provided between the high voltage junction block 100 and the inverter 200 surrounds the bus bar 111 of the high voltage junction block 100 and the terminal 211 of the inverter 200, so the external moisture may be protected from flowing between the bus bar 111 of the high voltage junction block 100 and the terminal 211 of the inverter 200.

Further, the shield plate 130 provided between the high voltage junction block 100 and the inverter 200 is disposed to surround the bus bar 111 of the high voltage junction block 100 and the terminal 211 of the inverter 200, so the noise generated from the inverter 200 may be protected from being leaked to the outside of the high voltage junction block 100 and the inverter 200.

Although a preferred embodiment of the present disclosure is described hereinabove, the present disclosure is not limited thereto, and various modifications can be made within the scope of the claims, and the detailed description of the present disclosure and the accompanying drawings, and belongs to the scope of the present disclosure, of course.

The invention claimed is:

1. A high voltage junction block comprising:
a block housing including a circuit module configured to distribute high voltage;
a bus bar extending from the block housing, and configured to supply electric power to an electric power supply target body;
a sealing member surrounding a circumference of the bus bar, and configured to prevent moisture from flowing into the bus bar and a terminal of the electric power supply target body electrically connected to the bus bar; and
a shield plate positioned between the block housing and the sealing member, and configured to prevent noise generated from the electric power supply target body from being leaked to an outside.

2. The high voltage junction block of claim 1, further comprising:
a protruding portion protruding from the block housing along the circumference of the bus bar; and
a seating portion formed at an outer periphery of the protruding portion, and on which the sealing member is seated.

3. The high voltage junction block of claim 2, wherein the sealing member includes:
a sealing body formed in a shape corresponding to an outer peripheral shape of the protruding portion; and
a sealing protrusion protruding toward the electric power supply target body from the sealing body.

4. The high voltage junction block of claim 3, wherein the sealing member is made of a rubber material.

5. The high voltage junction block of claim 1, wherein the shield plate includes:
a first part positioned between the block housing and the sealing member;
a second part extending toward the electric power supply target body from an outer periphery of the first part; and
a third part extending from an outer periphery of the second part, and being in contact with the electric power supply target body.

6. The high voltage junction block of claim 5, wherein the third part is tilted at a set angle toward the electric power supply target body, and is in contact with the electric power supply target body by elastic transformation.

7. The high voltage junction block of claim 5, wherein a plurality of embosses are formed in the third part.

8. The high voltage junction block of claim 5, wherein the shield plate is made of a metallic material which is elastically transformable.

9. A vehicle comprising:
an inverter including an inverter housing having a first circuit module driving a motor therein, and a terminal formed in the inverter housing; and
a high voltage junction block including a block housing having a second circuit module configured to distribute high voltage, a bus bar extending from the block housing, and electrically connected to the terminal, a sealing member surrounding a circumference of the bus bar, and configured to prevent moisture from flowing into the bus bar and the terminal, and a shield plate positioned between the block housing and the sealing member, and configured to prevent noise generated from the inverter from being leaked to an outside.

10. The vehicle of claim 9, further comprising:
a protruding portion protruding from the block housing along a circumference of the bus bar; and
a seating portion formed at an outer periphery of the protruding portion, and on which the sealing member is seated.

11. The vehicle of claim 10, wherein the sealing member includes:
a sealing body formed in a shape corresponding to an outer peripheral shape of the protruding portion; and a sealing protrusion protruding toward an electric power supply target body from the sealing body.

12. The vehicle of claim 11, wherein the sealing member is made of a rubber material.

13. The vehicle of claim 11, wherein the sealing member is in contact with the inverter housing.

14. The vehicle of claim 9, wherein the shield plate includes:
   a first part positioned between the block housing and the sealing member;
   a second part extending toward the inverter from an outer periphery of the first part; and
   a third part extending from an outer periphery of the second part, and being in contact with the inverter housing.

15. The vehicle of claim 14, wherein the shield plate is elastically transformable.

16. The vehicle of claim 14, wherein the third part is tilted at a set angle toward the inverter housing, and is in contact with the inverter housing by elastic transformation.

17. The vehicle of claim 14, wherein a plurality of embosses are formed in the third part.

* * * * *